United States Patent [19]

Bush et al.

[11] Patent Number: 5,172,595
[45] Date of Patent: Dec. 22, 1992

[54] BIN LEVEL CONTROL CIRCUIT AND TRANSDUCER MOUNTING SYSTEM FOR AN ICE MAKING MACHINE

[75] Inventors: Vincent N. Bush, Madison Lake, Minn.; Gregory L. Griswold, Lake Villa, Ill.

[73] Assignee: Scotsman Group, Inc., Vernon Hills, Ill.

[21] Appl. No.: 782,053

[22] Filed: Oct. 24, 1991

Related U.S. Application Data

[62] Division of Ser. No. 536,503, Jun. 12, 1990, Pat. No. 5,060,484.

[51] Int. Cl.⁵ .............................................. G01D 21/00
[52] U.S. Cl. .................. 73/290 V; 73/866.5; 403/348; 439/335
[58] Field of Search .......... 62/137; 340/621; 367/908; 73/290 V, 866.5; 439/335; 403/348, 349

[56] References Cited

U.S. PATENT DOCUMENTS

| | | | |
|---|---|---|---|
| 1,932,099 | 10/1933 | Cabana | 403/349 X |
| 3,184,969 | 5/1965 | Bolton | 73/290 V |
| 3,397,715 | 8/1968 | Fathauer | 137/387 |
| 4,008,613 | 2/1977 | Myers | 73/290 V |
| 4,170,311 | 10/1979 | Spaw | 414/289 |
| 4,221,004 | 9/1980 | Combs et al. | 73/290 V |
| 4,237,091 | 12/1980 | Lobdell et al. | 403/349 X |
| 4,437,497 | 3/1984 | Enander | 141/1 |
| 4,470,299 | 9/1984 | Soltz | 73/290 V |
| 4,565,088 | 1/1986 | Crambes | 73/61.1 R |
| 4,572,253 | 2/1986 | Farmer et al. | 73/290 V |
| 4,610,164 | 9/1986 | Sobue et al. | 73/290 V |
| 4,662,182 | 5/1987 | Tsukiyama et al. | 62/137 |
| 4,676,098 | 6/1987 | Erlenkamper et al. | 73/290 V |
| 4,677,305 | 6/1987 | Ellinger | 250/577 |
| 4,700,569 | 10/1987 | Michalski et al. | 73/290 V |
| 4,715,226 | 12/1987 | Dorr | 73/290 V |
| 4,770,038 | 9/1988 | Zuckerwar et al. | 73/290 V |
| 4,780,861 | 10/1988 | Stembridge et al. | 367/150 |
| 4,785,663 | 11/1988 | Hermann | 73/290 V |
| 4,785,664 | 11/1988 | Reebs | 73/290 V |
| 4,811,595 | 3/1989 | Marciniak et al. | 73/149 |
| 4,815,323 | 3/1989 | Ellinger et al. | 73/290 V |
| 4,821,569 | 4/1989 | Soltz | 73/290 V |
| 4,822,996 | 4/1989 | Lind | 62/137 X |
| 4,909,080 | 3/1990 | Kikuta et al. | 340/621 X |

*Primary Examiner*—William E. Wayner
*Attorney, Agent, or Firm*—Harness, Dickey & Pierce

[57] ABSTRACT

An ultrasonic bin level control circuit which employs a fail-safe circuit to shut off a compressor when echoes are late or absent, and a transducer mounting system which facilitates installation and removal of a transducer for servicing and cleaning. A level detector compares a reference signal with a reflected signal, the ice reaching a desired level when the reflected signal overlaps the reference signal. When the desired level is reached, the reference signal is modified through feedback to prevent short cycling of the compressor. The transducer is installed within a cylindrical housing which is easily installed and removed from a cylindrical socket within a compartment above the bin.

1 Claim, 6 Drawing Sheets

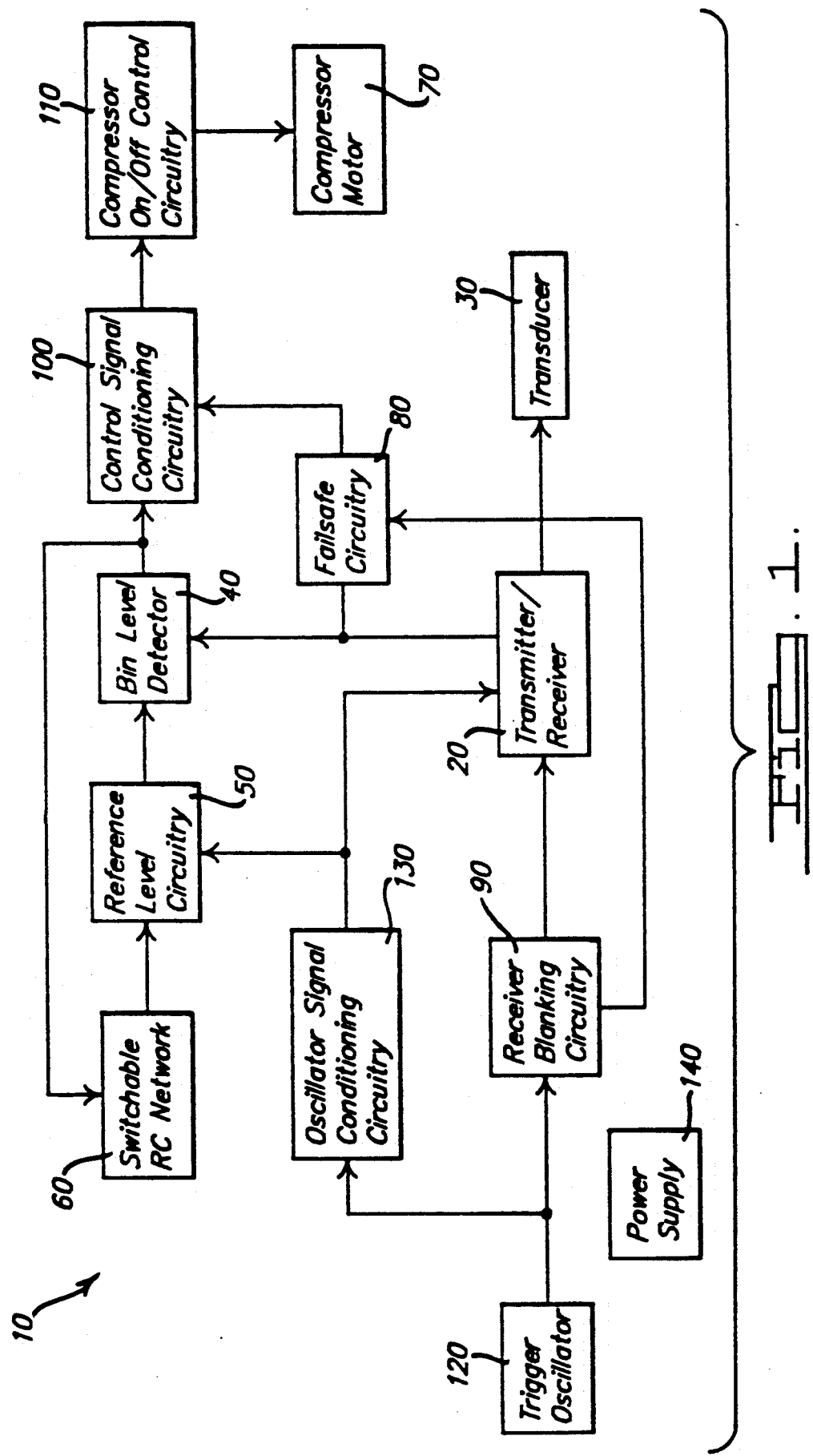

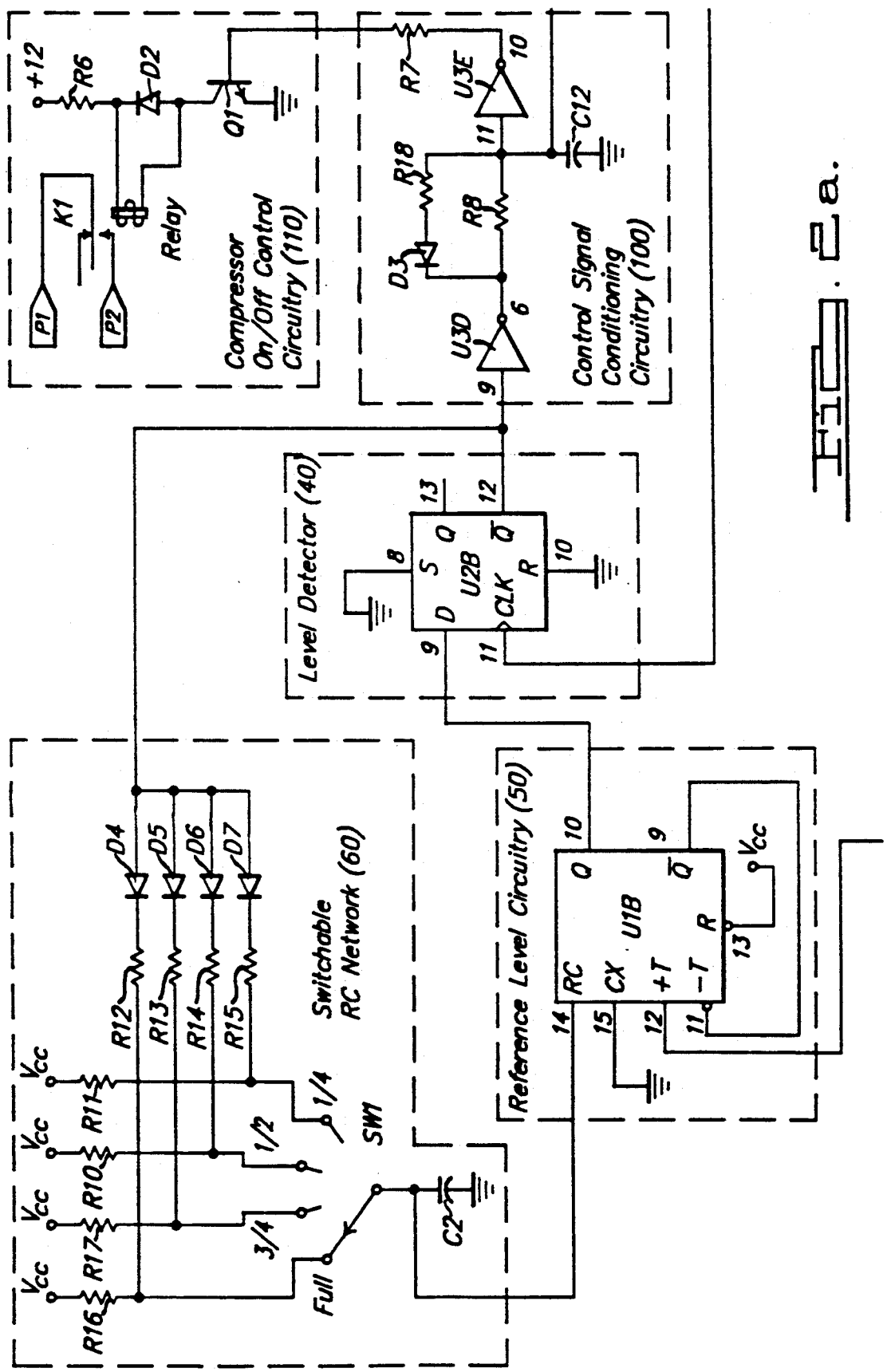

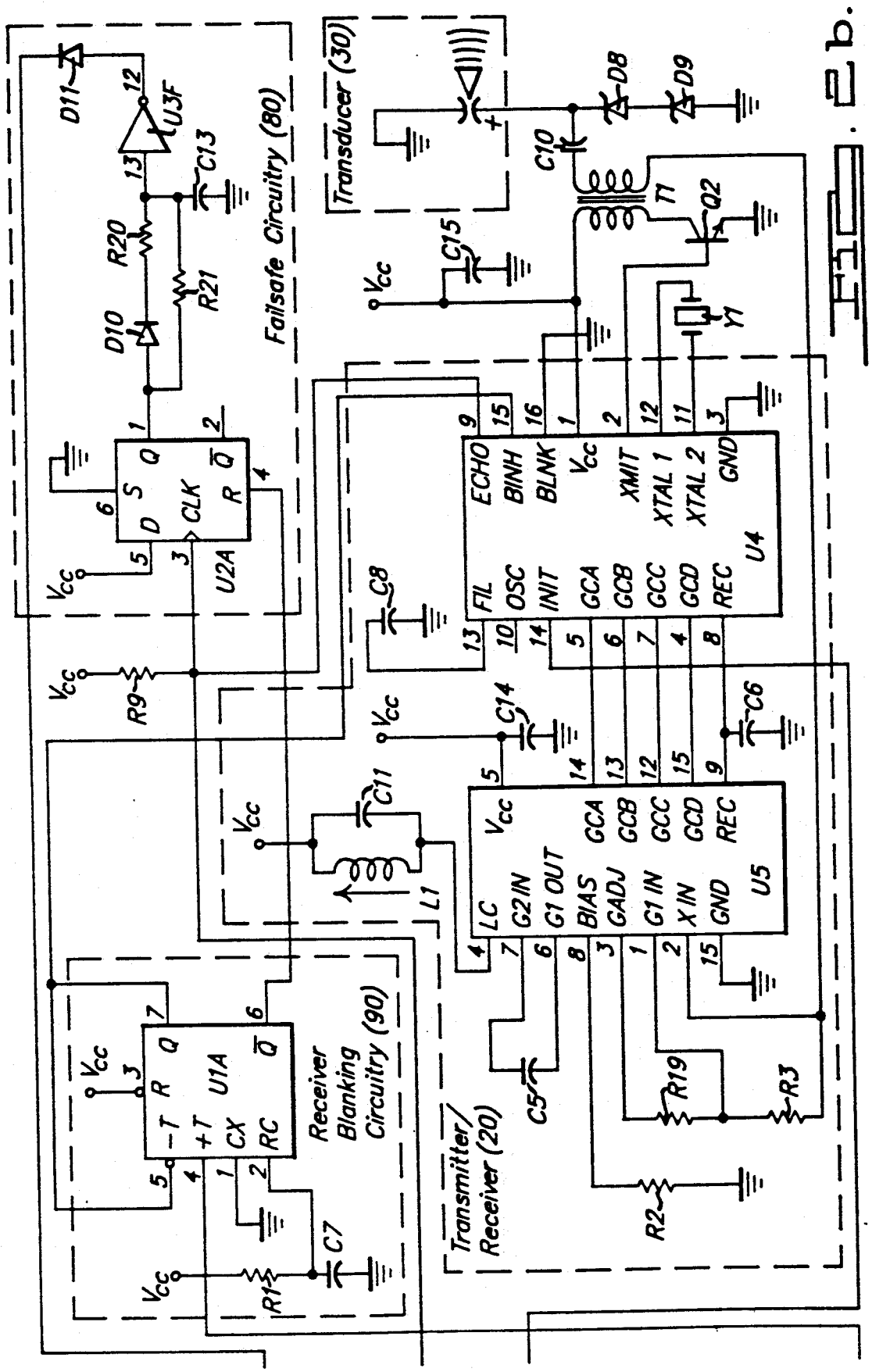

BIN LEVEL CONTROL CIRCUIT AND TRANSDUCER MOUNTING SYSTEM FOR AN ICE MAKING MACHINE

This is a division of U.S. patent application Ser. No. 07/536,503, filed June 12, 1990, now U.S. Pat. No. 5,060,484, entitled, "Bin Level Control Circuit and Transducer Mounting System for an Ice Making Machine."

BACKGROUND OF THE INVENTION

1. Technical Field

The present invention relates to volume level controllers are more specifically to an ultrasonic bin level control circuit and transducer mounting system for ice making machines.

2. Discussion

Ultrasonic volume level controllers are well documented. They employ a transmitter, a receiver and one or more transducers. The transmitter emits an electrical signal which is converted to acoustic energy by the transducer. The acoustic energy signal travels until it is reflected back to the transducer by the surface of the measured material. The transducer converts the reflected signal or echo back into an electrical signal which is detected by a receiver. The travel time in between the transmission and reception of the acoustic energy signal determines the depth of the measured material.

In volume level controllers, this depth information is used to maintain the depth of the measured material at a predetermined level. However, these systems lack reliable safeguards to ensure that the predetermined depths or volumes are not exceeded. Furthermore, both volume level detectors and controllers fail to disclose a transducer mounting system which provides quick and easy access and removal of transducers for servicing and cleaning.

SUMMARY OF THE INVENTION

In accordance with the teachings of the present invention, an ultrasonic bin level control circuit and transducer mounting system for an ice making machine is provided.

A transmitter-receiver emits a pulsed electromagnetic signal and receives the reflected pulsed electromagnetic signal. A transducer converts the emitted pulsed electromagnetic signal into an acoustic energy signal and receives the acoustic energy signal after it has reflected from the upper surface of the ice within the bin. A switch starts and stops changes in the level of the ice within the bin. A reference level circuit generates a pulsed reference signal whose pulse width determines the desired level of the ice within the bin. A level detector compares the pulsed reference signal with the reflected pulsed electromagnetic signal, the ice reaching the desired level when the reflected pulsed electromagnetic signal overlaps the pulsed reference signal. When the desired level is reached, the pulsed reference signal is modified through feedback to prevent short cycling of the compressor. A trigger oscillator establishes the phase relationships between the reflected pulsed electromagnetic signal and the emitted pulsed electromagnetic and pulsed reference signals. The circuit also employs a fail-safe circuit for stopping increases in the level of the ice when the reflected pulsed electromagnetic signal is late or absent. A receiver blanking circuit, controlled by the trigger oscillator, generates a blanking signal to shut off the receiver portion of the transmitter-receiver during transmission and generates a fail-safe signal for controlling the fail-safe circuit.

A transducer mounting system is also provided. The system employs a socket having a substantially cylindrical and vertical wall fastened above and upon the upper surface of the container. The socket has a channel within the wall, which has a first vertical section extending upward from the upper surface of the container, a horizontal section extending from the first vertical section and following the curvature of the socket, and a second vertical section extending downward from the horizontal section and having a length less than the first vertical section so as to form a detent. The transducer is contained within a housing having a substantially cylindrical and vertical wall and an upper surface. The housing is open at one end for exposing the emitting and receiving side of the transducer. The housing also has a race in the upper surface for passing the wire from the transducer. A pin extending radially outward from the wall of the housing is aligned with the channel, inserted upwards into the socket, and rotated into the detent.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings:

FIG. 1 is a block diagram of the ultrasonic bin level control circuit;

FIG. 2a is a schematic diagram of the ultrasonic bin level control circuit;

FIG. 2b is a continued schematic diagram of the ultrasonic bin level control circuit;

DETAILED DESCRIPTION OF THE PREFERRED EMBODIMENT

Figure 2C:
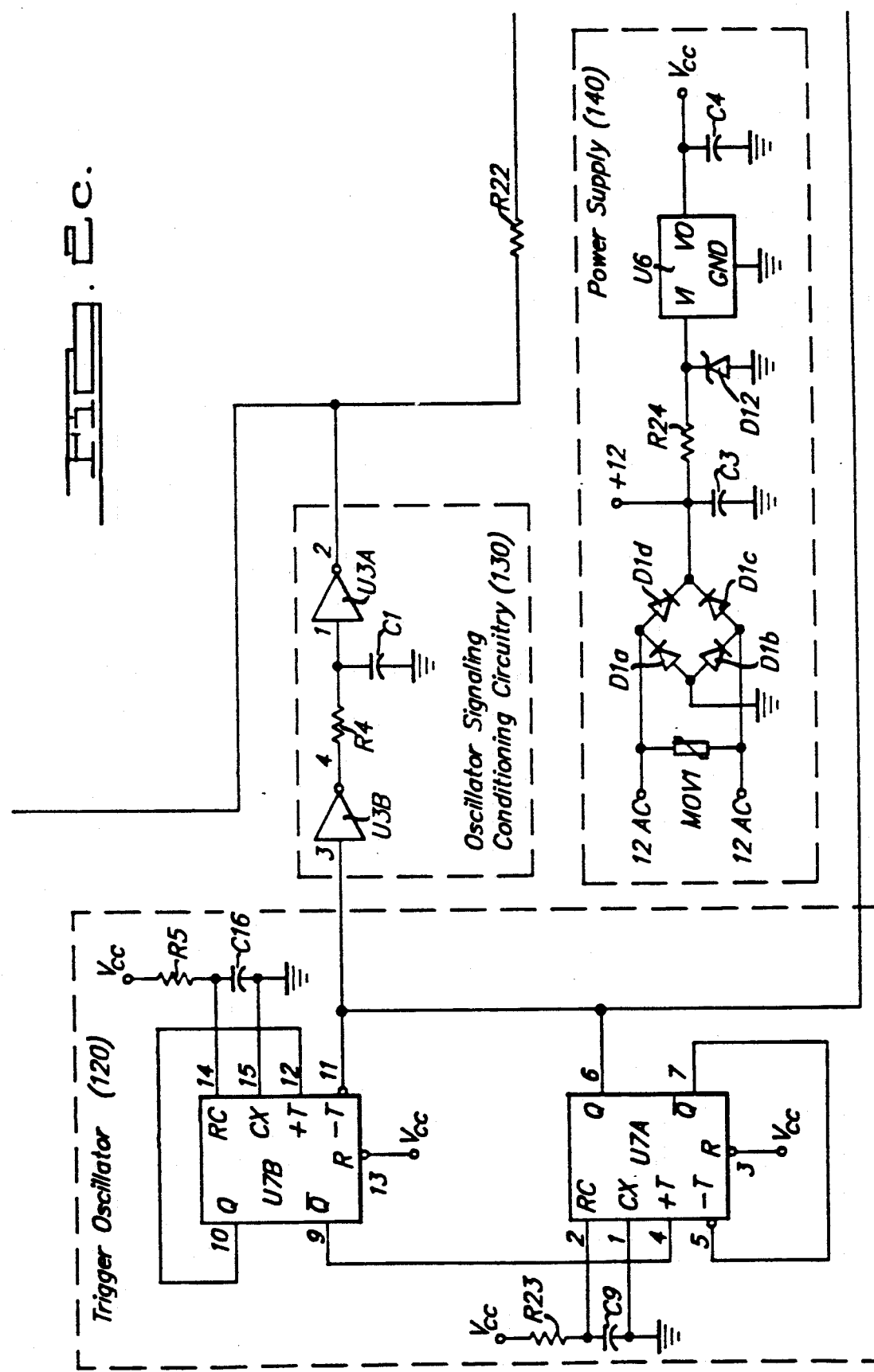
FIG. 2c is a continued schematic diagram of the ultrasonic bin level control circuit.

There is shown in FIG. 1 a block diagram of the ultrasonic bin level control circuit 10 of the present invention. A transmitter-receiver 20 sends an ultrasonic signal through the air towards the surface of the ice and measures the amount of time necessary for the echo or reflected signal to return. The transmitter-receiver 20 is coupled to a transducer 30, which converts electrical waves from the transmitter portion of the transmitter-receiver 20 into sound waves, and which converts returning echoes back into electrical waves for use by the receiver portion of the transmitter-receiver 20.

The echo signals are in the form of pulses. These signals are compared with a reference signal in the bin level detector 40. The reference signal is also in the form of pulses and is generated by the reference level circuitry 50. The pulse width of the reference signal is made variable by a switchable resistor-capacitor (RC) network 60; however, a fixed resistor-capacitor (RC) network corresponding to an arbitrary bin-full condition is also envisioned.

In operation, the bin level detector 40 signals the ice-maker to produce ice until the echo signal pulses overlap the reference signal pulses. Overlap occurs gradually as the return time of the transmitted signal becomes less and less due to an increase in the level of ice in the bin. The full bin condition modifies the switchable RC network 60 through feedback from the reference level circuitry 50. Feedback increases the pulse width of the reference signal, which changes the level that the ice must be at before the ice-maker will restart. In effect, feedback introduces a hysteresis, which is necessary to prevent short cycling of the compressor motor 70.

The fail-safe circuitry 80 halts operation of the ice-maker in the case of late or absent echo signals. It compares the echo signal with a signal from the receiver blanking circuitry 90, which also sends a signal to the transmitter-receiver 20 to disconnect the receiver portion while the transmitter is transmitting. The control signal conditioning circuitry 100 works in conjunction with the bin level detector 40 and the fail-safe circuitry 80 to insure smooth operation of the compressor motor 70. The compressor on/off control circuitry 110 employs control signals from the control signal conditioning circuitry 100 to either start or stop the compressor motor 70.

Trigger oscillator 120 provides a steady pulsed signal for triggering the transmitter-receiver 20, the reference signal from the reference level circuitry 50, and the receiver blanking signal from the receiver blanking circuitry 90. Oscillator signal conditioning circuitry 130 provides a delay between the trigger oscillator 120 and the transmitter-receiver 20. This delay ensures proper receiver blanking occurs before transmission starts.

Finally, the ultrasonic bin level control circuit 10 employs a standard power supply 140 which provides direct current (DC) power as needed by other components of the circuit 10 for control and biasing purposes.

Turning now to FIGS. 2a, b, and c, the transmitter-receiver 20 is made up of a standard Texas Instruments chip set. The receiver portion U5 has a Texas Instruments model number of TL852. The transmitter portion U4 has a Texas Instruments model number TL851. The receiver portion U5 employs a tuned tank circuit, made up of inductor L1 and capacitor C11 and tied to the bias voltage $V_{cc}$. Capacitor C5 is a coupling capacitor and resistor R2 is a biasing resistor. The resistors R19 and R3 are used for gain control. Finally, capacitor C14 is a smoothing capacitor for the bias voltage $V_{cc}$.

The transmitter portion U4 is coupled to the receiver portion U5. Capacitor C6 and C8 are filtering capacitors. Crystal Y1 is employed in the oscillator circuit of the transmitter U4. Transistor Q2 is a keying transistor which allows current to flow through the primary coil of transformers T1 during transmission. Capacitor C15 is a smoothing capacitor for the voltage $V_{cc}$ tied to primary coil of the transformer T1.

Transducer 30 is a standard Polaroid environmental transducer. It is coupled to transformer T1 using coupling capacitor C10 and zener diodes D8 and D9 which provide the required DC bias voltage for the transducer. The secondary coil of transformer T1 is coupled to the gain control resistors R19 and R3 for receiving the echo.

Receiver blanking circuitry 90 employs a monostable multivibrator U1A which generates a pulsed waveform for blanking reception during transmission. The blanking time is determined by the pulse width of the pulsed waveform. The pulse width in turn is determined by the resistor-capacitor (RC) network consisting of resistor R1 and capacitor C7. Receiver blanking circuitry 90 also generates a pulsed waveform for use by the fail-safe circuitry 80. Monostable multivibrator U1A corresponds to Motorola model number 14538BCP.

Trigger oscillator 120 is a dual monostable oscillator employing monostable multivibrators U7A and U7B, also manufactured by Motorola and having a model number 14538BCP. Resistor-capacitor circuits R23-C9 and R5-C16 determine the pulse width and period of the trigger signal, which in turn determines the maximum distance or maximum receiver listening time, and the measurement repetition rate. In the preferred embodiment, the pulse width is approximately 8 ms and the period is approximately 60 ms.

Under this oscillator configuration, the receiver listening time is close to the actual bin empty distance. Therefore, the chance of receiving false multipath echoes is minimized. Receiver U5 listens only during the 8 ms pulse width form the trigger oscillator 120. This configuration also allows independent adjustment of the receiver listen time and the repetition rate.

Trigger oscillator 120 produces a pulsed waveform output which is delayed by signal conditioning circuitry 130. Resistor R4 and capacitor C1 make up a delay filter. Schmitt Trigger U3B acts as a buffer between the oscillator and the R4-C1 circuit. Schmitt Trigger U3A provides a digital output from the R4-C1 delay filter. Resistor R22 couples the delayed output of trigger oscillator 120 to pin 14 of the transmitter U4. R22 limits the transistor base current at pin 14.

Reference level circuitry 50 employs a monostable multivibrator U1B, also manufactured by Motorola and having a model number 14538BCP. It produces a pulsed waveform output which is used as a reference by the bin level detector 40. The pulse width is variable and is determined by the switchable RC network 60.

The switchable RC network 60 employs a switch SW1, which is selectable by the operator of the ice bin. The switch SW1 has four settings: full, three-quarter full, one-half full and one-quarter full. Each setting employs a different resistance value. The full setting employs resistor R16, the three-quarter setting employs resistor R17, the one-half setting employs resistor R10, and the one-quarter setting employs resistor R11. The resistances for each of the four settings are modified when the bin level is increasing towards the desired setting by resistors R12 through R15. A high output at pin 12 of level detector 40 causes diodes D4 through D7 to conduct, effectively placing resistors R12 through R15 in parallel with their respective resistors R10, R11, R16, and R17. When the ice reaches the desired level, the output at pin 12 of level detector 40 goes low causing diodes D4 through D7 to be reverse biased. The pulse width of the reference signal is thereby increased to allow the ice level in the bin to fall to a level less than the level set by the switch SW1 before the compressor is again signaled to produce ice. This hysteresis is necessary to prevent short cycling of the compressor.

The bin level detector 40 employs a D-type flip-flop U2B which is manufactured by Motorola and has a model number 14013BCP. The echo signal from the transmitter U4 is used to clock the reference signal through the D-type flip-flop. When the echo pulse overlaps the reference signal from the reference level circuitry 50, the output at pin 12 is low and the compressor is shut off. In addition to providing normal on/off control signals for the compressor motor 70, the bin level detector 40 provides inherent fail-safe mechanisms in case the echo signals are early. In that case, the output at pin 12 will become low and the compressor will not operate. Resistor R9 drops voltage $V_{cc}$ when the output at pin 9 of transmitter U4 is low.

If the echoes are late, or absent, then the fail safe circuitry 80 provides protection to the circuit 10 by shutting off the compressor motor 70. It employs a D-type flip-flop U2A, also manufactured by Motorola and of the model number 14013BCP. However in this case, the input terminal pin 5 is tied to a constant voltage of $V_{cc}$. Pin 4 is coupled to the receiver blanking circuitry 90 and receives a pulsed waveform having a low duty cycle.

Control signal conditioning circuitry 100 employs Schmitt Trigger U3D, resistor R8, diode D3, resistor R18, Schmitt Trigger U3E and resistor R7 to condition the output signal of the bin level detector 40. During normal operation, ice is produced in a mechanism mounted above the bin and is periodically harvested. When this new ice falls into the bin, it can generate many spurious or false returns which could prematurely stop the machine. Conditioning circuit 100 filters out these false, premature, compressor-off signals. Schmitt Trigger U3D acts as a buffer between level detector 40 and the RC delaying circuit made up of diode D3, resistor R18, resistor R7, and capacitor C12. Schmitt Trigger U3E provides a digital output from the RC delaying circuit and provides base drive current to turn transistor Q1 on or off. Transistor Q1 turns the compressor motor 70 on and off via relay K1.

When more ice is required, the output of level detector 40 at pin 12 is high. This output is buffered and inverted by Schmitt Trigger U3D. A low output from Schmitt Trigger U3D discharges capacitor C12 quickly through diode D3 and resistor R18 and also through resistor R8. The output of Schmitt Trigger U3E goes high, providing base drive to transistor Q1 and turning it on. Relay K1 is energized, causing the compressor to make more ice.

Conversely, when the level detector 40 detects the bin is full or receives a false echo, its output at pin 12 will be low. A high output from Schmitt Trigger U3D slowly charges capacitor C12 through resistor R8. The low resistance charge path through resistance R18 is blocked by diode D3. False echoes during a harvest last only a short time and the slow charging of capacitor C12 will filter them out.

Under normal conditions, the output of fail-safe circuitry 80 is an open, or reverse biased condition of diode D11. Thus, the fail-safe circuitry 80 has no effect on the conditioning circuit 100. If for any reason an echo is not received, the output at pin 12 of bin level detector 40 could be left in a high state indefinitely, possibly causing damage to the ice making mechanism or, at a minimum causing the bin to overflow with ice. The fail-safe circuitry 80 will prevent overflow or damage due to late or absent echoes.

At the beginning of each transmit-receive cycle, D-type flip-flop U2A is reset by the receiver blanking circuitry 90. The output at pin 1 of D-type flip-flop U2A goes low when reset, slowly discharging capacitor C13 through resistor R21. A quicker discharge path through resistor R20 is blocked by diode D10. Capacitor C13 continues to discharge slowly in the absence of an echo. If an echo is never received, capacitor C13 discharges enough to cause the output of Schmitt Trigger U3F to go high. Diode D11 conducts, allowing capacitor C12 to charge. The output of Schmitt Trigger U3E goes low, thus turning off the compressor motor 70 even though the output at pin 12 of the level detector 40 is still high.

Conversely, if the echo returns, it clocks the output at pin 1 of D-type flip-flop U2A to a high state. Capacitor C13 quickly charges through diode D10 and resistor R20, causing the output of Schmitt Trigger U3F to go low. A low output from Schmitt Trigger U3F reverse biases diode D11; therefore, diode D11 has no effect on capacitor C12. The time constants resistor R20 x capacitor C13 and resistor R21 x capacitor C13, are selected such that normal echoes will always keep capacitor C13 charged high enough to keep the output of Schmitt Trigger U3F low.

If the receiver U5 or transducer 30 fails, causing the output at pin 9 of transmitter U4 to remain high or low, or if the echo returns too late, the fail-safe circuitry 80 will turn the compressor motor 70 off. How late an echo can arrive and still be processed is determined by the duty cycle of the trigger oscillator 120. The receiver U5 remains active as long as the output of the trigger oscillator 120 is high. The values of capacitor capacitor C9 and resistor R23 are selected to obtain the desired duty cycle. A longer high time will allow an echo to arrive later. Thus, the duty cycle also determines the maximum empty bin distance.

In the case of a late echo, operation of the fail-safe circuitry 80 is similar to the case of absent echo. The output at pin 9 of transmitter U4 remains low. D-type flip-flop U2A is never clocked, allowing capacitor C13 to fully discharge, causing the output of Schmitt Trigger U3F to go high. A high output from Schmitt Trigger U3F turns the compressor motor 70 off, as previously described, thereby providing a full fail-safe function.

The compressor on/off control circuitry 110 employs switching transistor Q1 to activate a relay K1. When energized, the relay K1 activates the compressor motor 70. Diode D2 provides a path for current when the relay is de-energized. The compressor on/off control circuitry 110 is coupled to a 12-volt supply through resistor R6, which limits the coil current in relay K1.

Power supply 140 provides DC power for the entire circuit 10. It accepts 12-volt AC power which is full-wave rectified by diodes D1a–d and smoothed by capacitor C3 to produce a 12-volt DC source for operating the compressor relay K1. Over-voltage protection circuit MOV1, which is common in the industry, provides noise immunity and over-voltage suppression. Twelve-volt DC power is transformed to the output voltage of $V_{cc}$ for the rest of the circuit 10 using a voltage conversion module U6, model number 7805, also common in the industry, and a smoothing capacitor C4. Resistor R24 limits current to zener diode D12 and drops the input voltage to the voltage conversion module U6.

Figure 3:
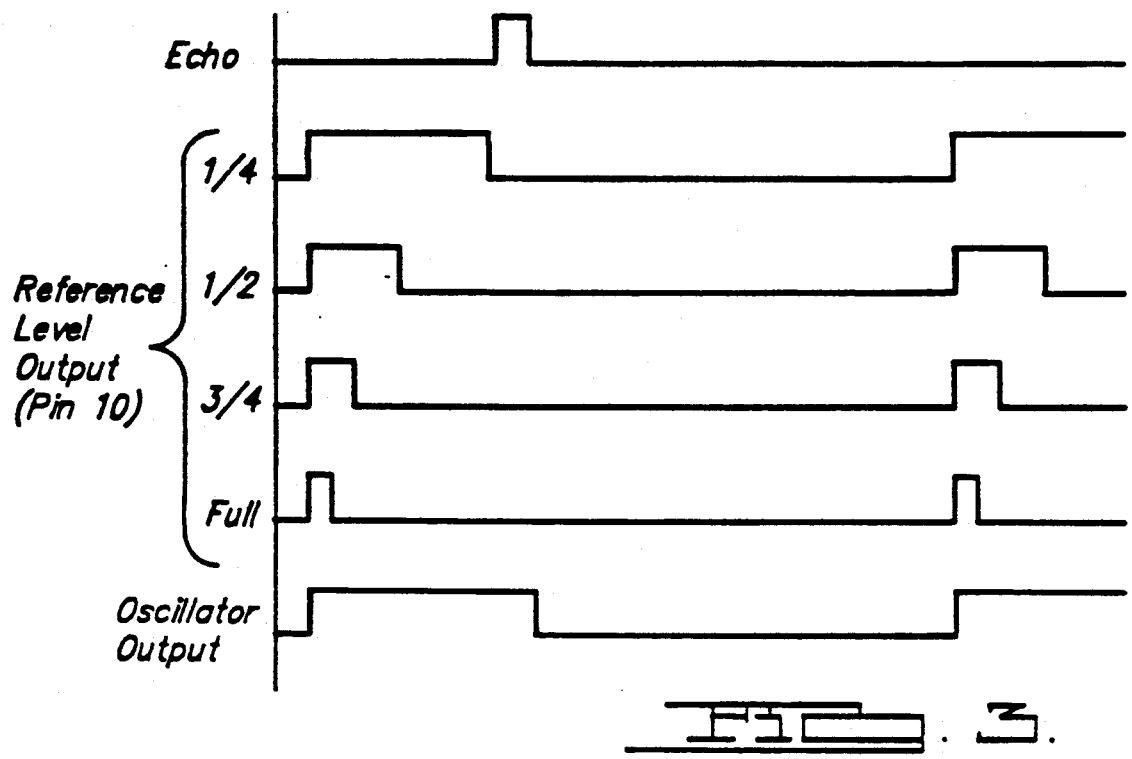
FIG. 3 is a timing diagram illustrating the trigger signal, the reference signals, and an empty bin echo signal.

Turning now to FIG. 3, the operation of the bin level detector 40 and the switchable RC network 60 will be explained in more detail. The top waveform in FIG. 3 represents the echo or reflected signal for an empty bin, referenced to the output signal of the trigger oscillator 120 shown at the bottom. Also shown are reference level signals corresponding to the four switch positions of SW1. The pulse width for the reference signal corresponding to the one-quarter setting is the largest and the pulse width corresponding to the full setting is the smallest.

As shown, the empty echo signal does not overlap any of the reference level pulses below it. Therefore, the output of the bin level detector 40 will be high and the compressor motor 70 will be energized. As the level of ice in the bin rises, the time for the transmitted pulse to reach the ice level and come back will decrease. This decrease in travel time of the echoes is reflected as a gradual leftward movement of the echo pulse in FIG. 3. As the pulse width of the echo pulse increases, the leading edge of the echo pulse moves to overlap the reference level pulses. When overlap occurs, the output of the bin level detector 40 goes low and the compressor motor 70 is shut off.

Figure 4A:
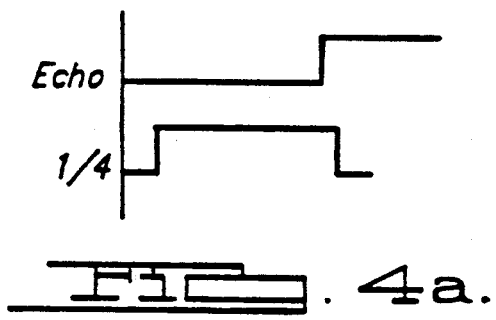
FIG. 4a is a timing diagram illustrating a reference signal for a quarter-full bin and an echo signal for a quarter-full bin.
Figure 4B:
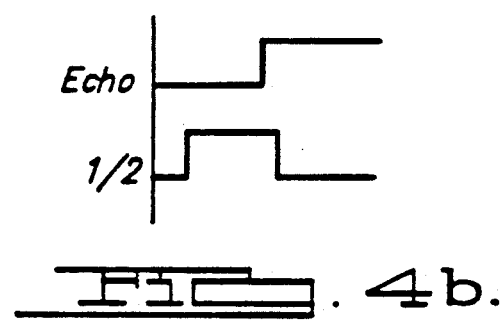
FIG. 4b is a timing diagram illustrating a reference signal for a half-full bin and an echo signal for a half-full bin.
Figure 4C:
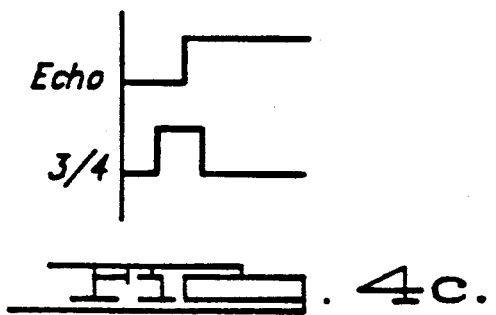
FIG. 4c is a timing diagram illustrating a reference signal for a three-quarter-full bin condition and an echo signal for a three-quarter-full condition.
Figure 4D:
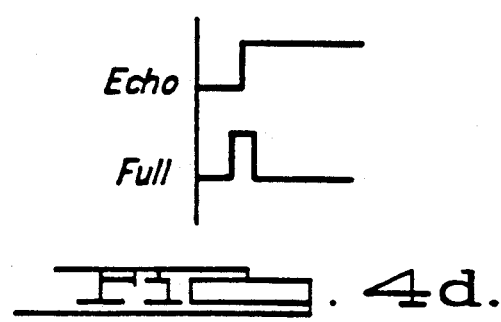
FIG. 4d is a timing diagram illustrating a reference signal of a full-bin condition and an echo signal corresponding to a full-bin.

FIGS. 4a-d illustrate the overlap condition for each of the reference level settings. In FIG. 4a, the echo signal moves only a short distance before overlapping the large pulse for the one-quarter setting. In FIG. 4b, the echo has to move farther left to overlap the pulse of the one-half setting. In FIG. 4c, the echo has moved further left in order to overlap the pulse width of the three-quarter setting. Finally in FIG. 4d, the echo has reached its farthest point to the left in overlapping the smallest pulse width signal of the full setting.

Figure 5:
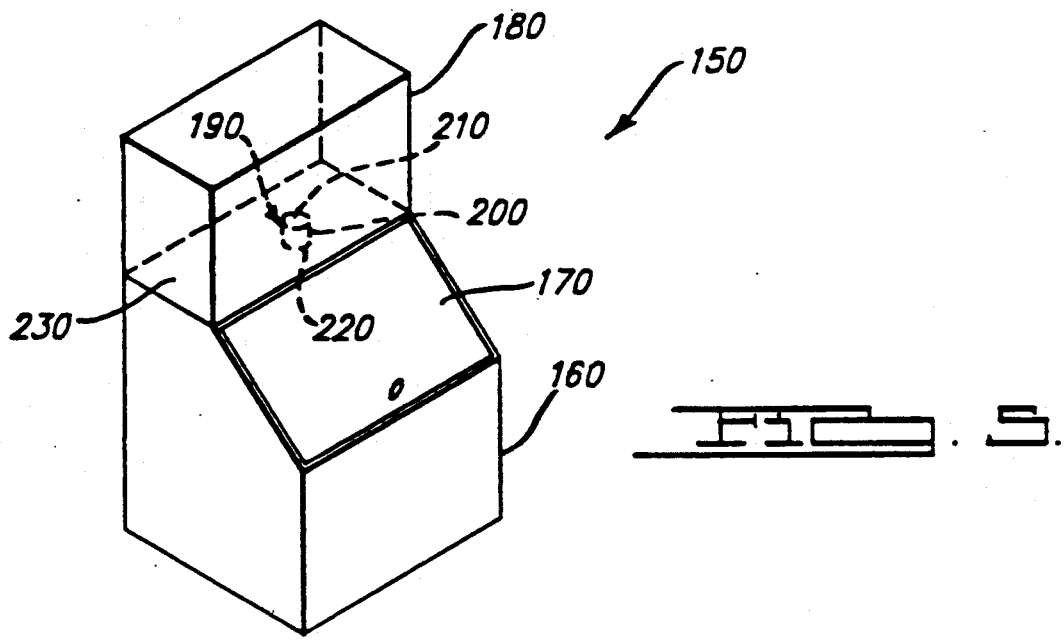
FIG. 5 is a perspective view of a typical ice-making machine for use with the present invention.
Figure 6:
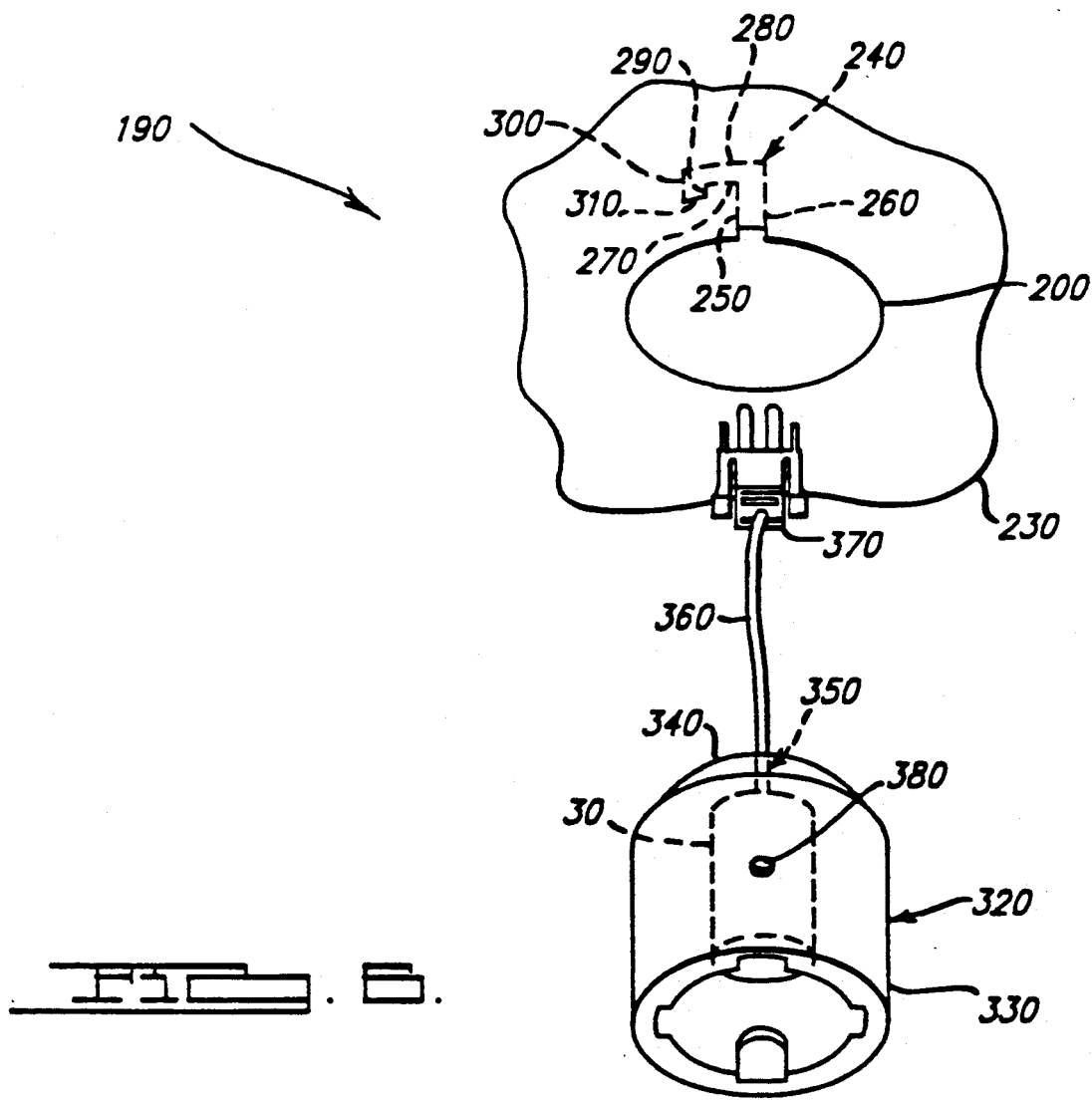
FIG. 6 is an enlarged view of the transducer mounting system of the present invention.

Turning now to FIGS. 5 and 6, there is shown a typical ice bin 150 employing the present invention. A storage compartment 160 collects the ice which is accessible through a door 170. The control circuit 10 and the compressor are located above the storage compartment 160 in the compartment 180.

The compartment 180 has a socket 190 for the transducer 30. The socket employs a substantially cylindrical and vertical wall 200. The socket 190 is open at both the upper edge 210 and the lower edge 220 of the wall 200. The lower edge 220 meets and is flush with the bottom surface 230 of the compartment 180. The socket 190 is also equipped with a channel 240 within the wall. The channel 240 has a first vertical section made up of edges 250 and 260, a horizontal section made up of edges 270 and 280 and a second vertical section made up of edges 290, 300 and 310.

The transducer 30 is contained within a substantially cylindrical housing 320 having a substantially cylindrical and vertical wall 330 and an upper surface 340. Within the upper surface 340 is a cylindrical race 350 for a wire 360 from the transducer 30. A plug 370 connects the transducer with the bin level control circuit 10. A receptacle wire for this purpose is accessible from within the socket 190. The housing 320 is also equipped with a pin 380, extending radially outward from the wall 330 for securing the housing 320 within the socket 190.

Access to the transducer 30 is achieved through door 170. During installation the plug 370 is connected and the housing 320 is raised into the socket 190 such that the pin 380 is aligned with its respective channel 240. The housing 320 is then raised until the pin 380 contacts the upper surface 280 of the channel 240. The housing 320 is then rotated such that the pin 380 moves transversely in the horizontal section resting upon edge 270. When the pin 380 contacts the surfaces 300, the housing 320 is allowed to drop in the second vertical section coming to rest upon surface 310 which forms a detent.

Removal is the opposite of installation. The housing 320 is raised slightly out of the second vertical section until the pin 380 contact the surface 280 of the channel 240. The housing 320 is then rotated such that the pin 380 move transversely in the horizontal section resting upon edge 270 until coming in contact with the surface 260. The housing 320 is then allowed to drop until it clears the bottom surface 230 of the compartment 180. The plug 370 is then disconnected. Advantageously, the transducer can be easily be removed for service or cleaning and can be just as easily reinstalled.

| Representative Element Values | | | |
|---|---|---|---|
| R1 | 6.65K/1% | C1 | .001/1% |
| R2 | 68K | C2 | .1/5% |
| R3 | 5.1K | C3 | 220/20% |
| R4 | 1K | C4 | 100/20% |
| R5 | 180K | C5 | .1/5% |
| R6 | 68 | C6 | 1000pfd/5% |
| R7 | 1K | C7 | .15/5% |
| R8 | 470K | C8 | 5.8/10% |
| R9 | 10K | C9 | .33/5% |
| R10 | 43K | C10 | .0022/10% |
| R11 | 56K/1% | C11 | .01/20% |
| R12 | 180K/1% | C12 | 5.8/10% |
| R13 | 330K/1% | C13 | 6.8/10% |
| R14 | 470K/1% | C14 | .1/5% |
| R15 | 510K/1% | C15 | 47/20% |
| R16 | 24K/1% | C16 | .33/5% |
| R17 | 33K/1% | | |
| R18 | 10K/1% | | |
| R19 | 3.3K | | |
| R20 | 10K | | |
| R21 | 470K | | |
| R22 | 2.2K | | |
| R23 | 24K | | |
| R24 | 68/1w | | |

Although the invention has been described with particular reference to certain preferred embodiments thereof, variations and modifications can be effected within the spirit and scope of the following claims.

What is claimed is:

1. An apparatus for mounting a transducer in an upper surface of a container, the transducer being part of an ultrasonic volume level control circuit, said apparatus comprising:
    (a) socket means for receiving said transducer having a substantially cylindrical and vertical wall including upper and lower edges, the lower edge meeting and being fastened upon the upper surface of the container, said socket means having a channel in said wall having a first vertical section extending upward from the upper surface of the container, a horizontal section extending from the upper most tip of the first vertical section and following the curvature of the wall of said socket means, and a second vertical section extending downward from the horizontal section and having a length less than the first vertical section so as to form a detent; and
    (b) housing means for containing said transducer, said housing means including a substantially cylindrical and vertical wall so as to fit within said socket means and having an upper surface, said transducer being inserted within said housing means such that the emitting side of said transducer is exposed and facing downward, the upper surface of said housing means having a race for passing a wire from the transducer, said housing means also having a pin extending radially outwardly from said wall of said housing means, said pin resting within the second vertical section within said channel when said transducer is mounted within said socket.

* * * * *